W. G. LESSERT & B. S. McWILLIAMS.
UNIVERSAL JOINT.
APPLICATION FILED APR. 15, 1915.

1,181,902.                                          Patented May 2, 1916.

Witnesses
Guy M. Spring
Ross J. Woodward

Inventors
Walter G. Lessert
Benjamin S. McWilliams
By Richard B. Owen
Attorney

UNITED STATES PATENT OFFICE.

WALTER G. LESSERT AND BENJAMIN S. McWILLIAMS, OF MERRIMAN, NEBRASKA.

UNIVERSAL JOINT.

1,181,902.      Specification of Letters Patent.      Patented May 2, 1916.

Application filed April 15, 1915. Serial No. 21,526.

*To all whom it may concern:*

Be it known that we WALTER G. LESSERT and BENJAMIN S. McWILLIAMS, citizens of the United States, residing at Merriman, in the county of Cherry and State of Nebraska, have invented certain new and useful Improvements in Universal Joints, of which the following is a specification.

This invention relates to an improved universal joint and the principal object of the invention is to provide a universal joint so constructed that it may be used for connecting the spindles of a guiding wheel with the axle of a vehicle such as an automobile.

Another object of the invention is to provide a universal joint which will be very strong and durable and not liable to easily get out of order or need repair.

This invention is illustrated in the accompanying drawings, wherein:—

Figure 1:
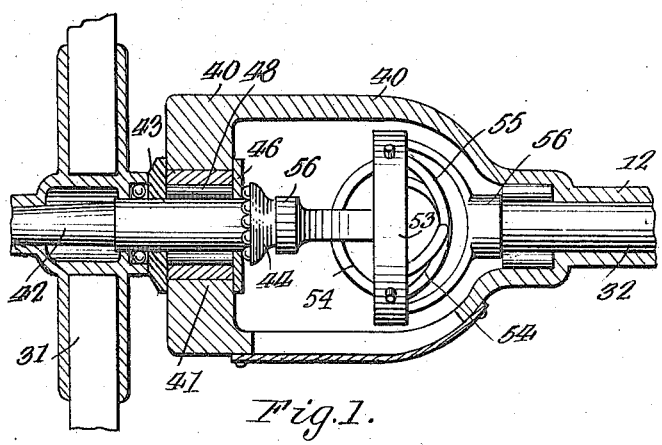
Figure 2:
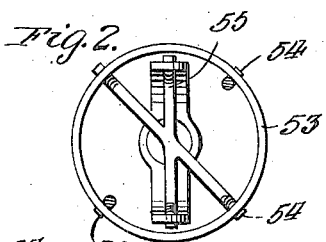
Figure 3:
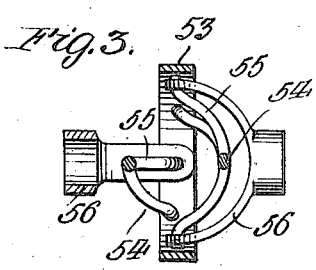
Figure 4:
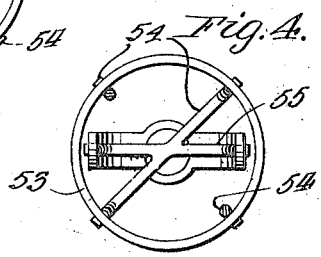

Figure 1 is a sectional view showing the universal joint in use. Figs. 2, 3 and 4 are views of the universal joint used in connection with the transmission of an automobile.

This universal joint has been shown used in connection with an automobile for connecting the spindles with the axle so that the spindles may move transversely of the axle when guiding the machine but it is understood that the joint could be used for connecting any shaft with a second shaft intended to rotate with the first mentioned shaft and either mounted for angular adjustment or mounted at an angle to the first mentioned shaft. Only a fragment of the automobile has been shown, this consisting briefly of the supporting axle, axle casing, spindles, wheels and mounting for the spindles, the improved type of universal joint being shown connecting the axle with the spindles in Fig. 1.

The axle casing 12 is provided at each end with an enlarged head or housing 40 which is provided with a transversally extending slot 41 through which the spindle 42 passes. Each of these spindles is constructed and mounted as shown in Fig. 1 and from an inspection of this figure it will be seen that the wheel 31 is rotatably mounted upon the outer end portion of the spindle and has the inner end of its hub engaging the plate 43 rigidly mounted upon the spindle. Adjacent the cup 44 at the inner end of the spindle there is provided a curved plate 46 positioned inside of the head 40, the faces of the plates 43 and 46 being curved as clearly shown in Fig. 3 so that they will conform to the contour of the head and thus permit the spindle to be swung in the desired direction. A sleeve or bearing 47 having rollers 48 mounted therein is positioned between the plates 43 and 46 about the spindle so that rotation of the spindle will be smooth. A suitable steering mechanism may be connected with the bearing for swinging the spindle to guide the vehicle, the steering mechanism not being shown, as any preferred form may be used. These spindles are connected with the axle by universal joints which will now be described in detail. The band 53 forming part of each of these joints is provided with openings in which the U-shaped knuckles 54 will be pivotally mounted. These knuckles 54 are positioned at right angles to each other as clearly shown in Fig. 2 and carry inner U-shaped yokes 55 extending diagonally of the knuckles 54 but at right angles to each other. These yokes have their end portions passing through openings formed in the arms of the brackets 56 which brackets are preferably internally threaded so that the universal joint may be connected with the axle and spindle.

We have thus provided a universal joint which is so constructed that the spindles may be connected with the axle and allowed to turn for guiding the automobile or other vehicle, the joint being strong and durable and not liable to easily break.

What is claimed is:—

1. In a universal joint a driving element, a driven shaft, and a means connecting said driving element with said driven shaft, said means comprising a band, U-shaped knuckles pivotally connected with said band and extending in opposite directions at right angles to each other, yokes carried by said knuckles and extending diagonally of the knuckles and at right angles to each other, and brackets straddling said knuckles and pivotally connected with said yokes and rigidly connected with said driving element and driven shaft.

2. A universal joint comprising a band, U-shaped knuckles pivotally connected with said band and extending in opposite directions at right angles to each other, U-shaped yokes carried by said knuckles and extending diagonally of the same at right angles to each other, and attaching means pivotally connected with said yokes.

3. A universal joint comprising a band, U-shaped knuckles pivotally connected with said band and extending in opposite directions, U-shaped yokes carried by said knuckles and extending diagonally of the same, and attaching means pivotally connected with said yokes.

4. A universal joint comprising a band, U-shaped knuckles pivotally carried by said band and extending in opposite directions, yokes carried by said knuckles, and attaching means straddling said knuckles and pivotally connected with said yokes.

In testimony whereof we affix our signatures in presence of two witnesses.

WALTER G. LESSERT.
BENJAMIN S. McWILLIAMS.

Witnesses:
C. EVERETT LANCASTER,
M. E. JONES.

Copies of this patent may be obtained for five cents each, by addressing the "Commissioner of Patents, Washington, D. C."